UNITED STATES PATENT OFFICE.

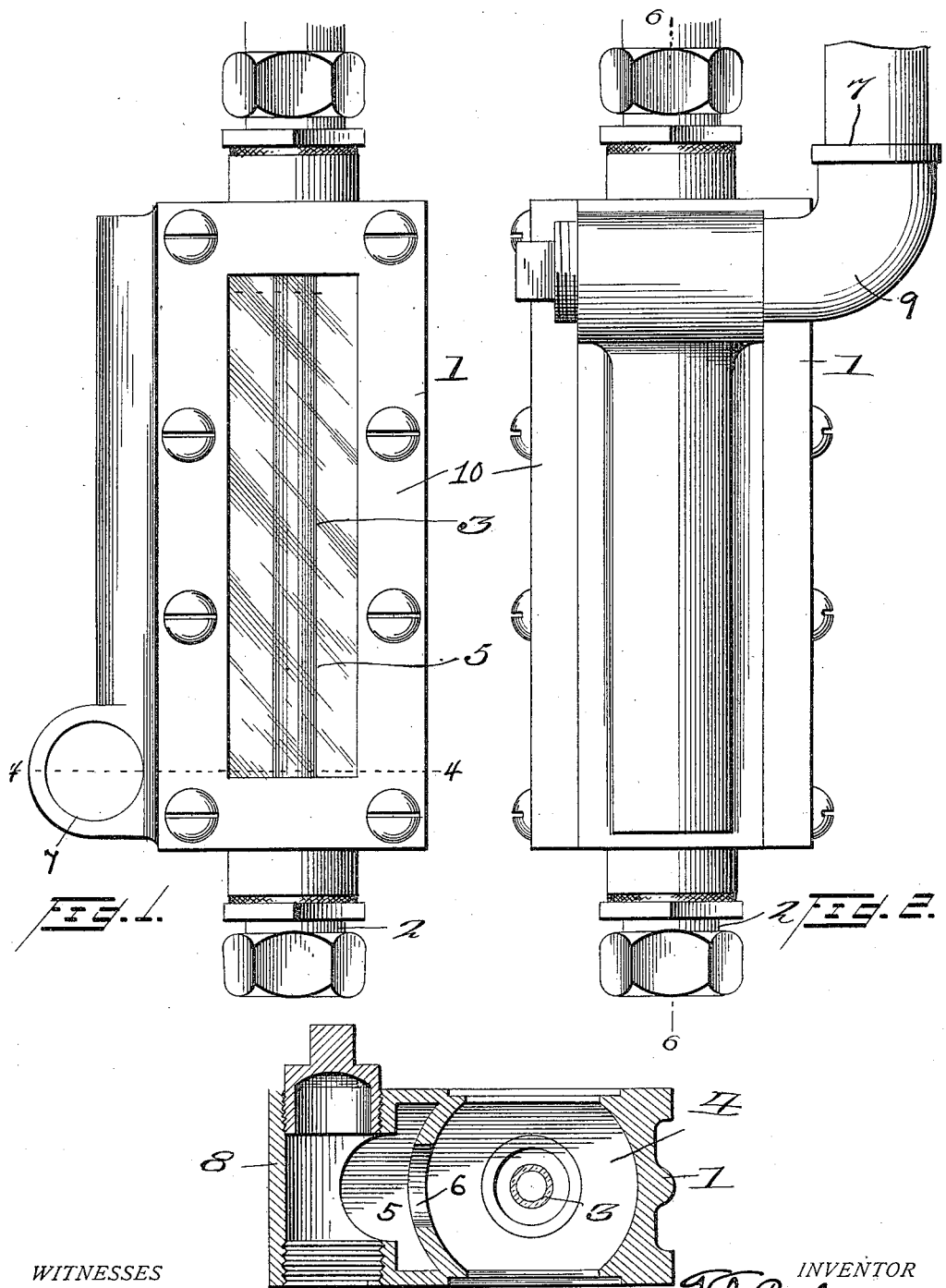

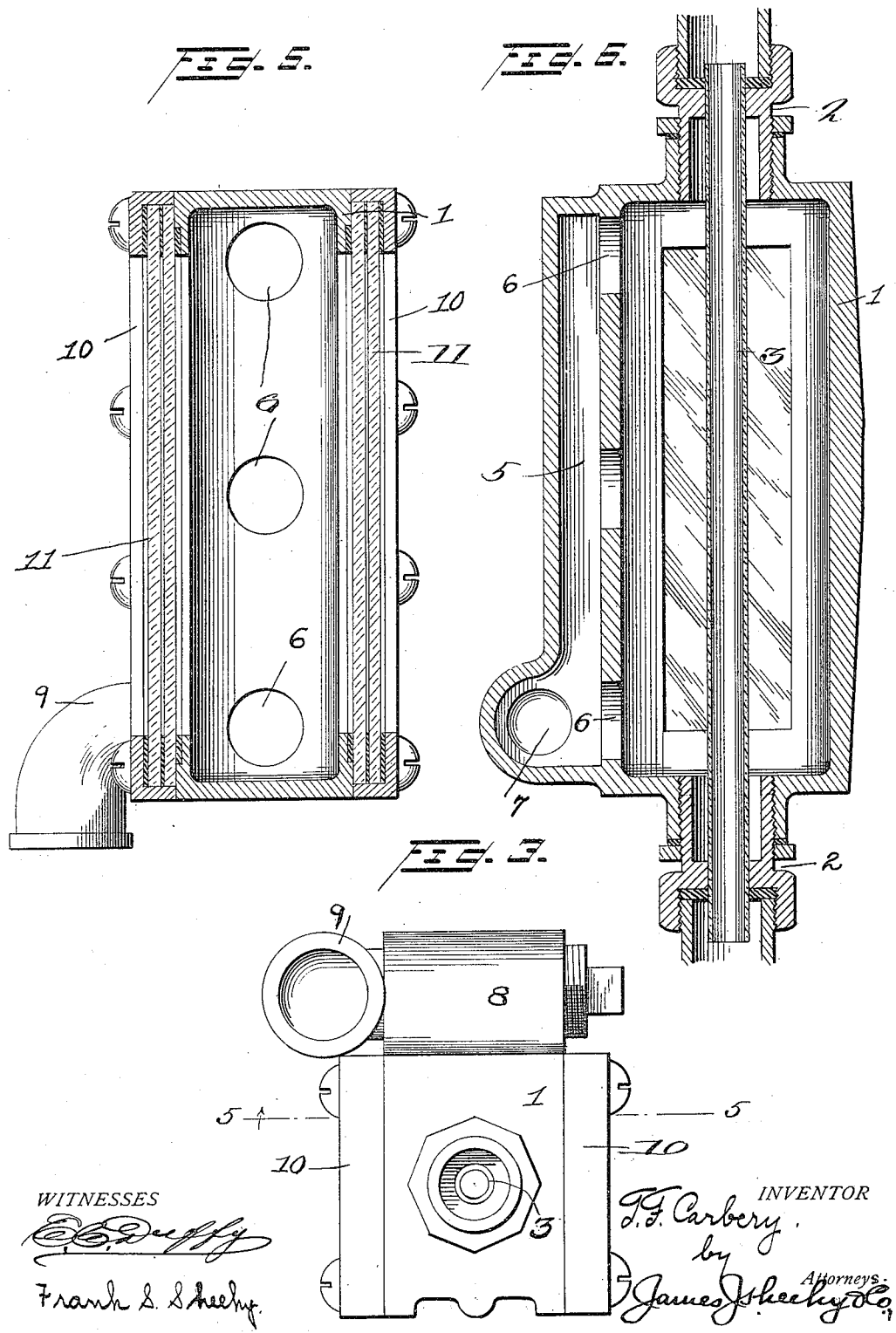

THOMAS F. CARBERY, OF ST. LOUIS, MISSOURI.

SHIELD FOR WATER-GAGE GLASSES.

1,080,952.     Specification of Letters Patent.     Patented Dec. 9, 1913.

Application filed April 3, 1913. Serial No. 758,676.

*To all whom it may concern:*

Be it known that I, THOMAS F. CARBERY, citizen of the United States, residing at St. Louis, in the State of Missouri, have invented new and useful Improvements in Shields for Water-Gage Glasses, of which the following is a specification.

My present invention pertains to means for inclosing water gage glasses; and it contemplates the provision of a shield for water gage glasses constructed with a view to preventing flying glass in the event of the gage glass bursting and at the same time carry away the steam and boiling water incidental to the bursting.

With the foregoing in mind the invention in all of its details will be fully understood from the following description and claims when the same are read in connection with the drawings accompanying and forming part of this specification, in which:

Figure 1 is a front elevation illustrative of the shield constituting the best practical embodiment of my invention, of which I am cognizant. Fig. 2 is a side elevation taken at a right angle to Fig. 1 and showing that the device can be used in inverted position. Fig. 3 is an inverted plan view. Fig. 4 is a horizontal section taken in the plane indicated by the line 4—4 of Fig. 1. Fig. 5 is a vertical section taken through the two glass panels of the shield, in the plane indicated by line 5—5 of Fig. 3. Fig. 6 is a vertical section taken at a right angle to Fig. 5, and in the plane indicated by the line 6—6 of Fig. 2, but showing the device in the preferred position—*i. e.*, with the discharge at the lowermost point of the shield.

Similar numerals of reference designate corresponding parts in all of the views of the drawings.

Among other features, my novel shield comprises a body 1, suitably formed of metal and provided at its upper and lower ends with suitable glands 2 adapted for the holding and connection of the water gage glass indicated by 3. It will also be observed that the body 1 is hollow, as indicated by 4 in Fig. 4, and that it is provided at one side with a chamber 5. This chamber 5 is connected with the interior of the body through a plurality of apertures 6, Figs. 5 and 6, and it will be observed that the chamber is provided adjacent one of its ends with an outlet 7, which, by preference, is formed by a pipe threaded into an offset portion 8, as indicated by 9.

In addition to the body, the shield comprises panel holders 10, screwed or otherwise connected to opposite sides of the body, as clearly illustrated. In the holders are arranged and suitably secured glass panels 11, and in the preferred embodiment of my invention I prefer, for the sake of safety and strength, to employ two glass panels in each holder.

It will be gathered from the foregoing that the glass panels 11 afford a clear view of the water gage glass 3, and yet in the event of the glass 3 bursting from any cause, the fragments of glass will be confined in the shield, and in that way effectually prevented from injuring any person who may be in close proximity to the gage at the time of the accident. It will also be observed that escaping steam and scalding water will be prevented from escaping from the shield except through the outlet 7 which may, when deemed expedient, be connected to a pipe (not shown) leading outside of a locomotive cab or to any other desired point of discharge.

In addition to the advantages hereinbefore ascribed to the shield, attention is directed to the fact that by reason of its construction the shield is adapted to strongly hold the water gage glass 3 and protect the same from extraneous injury, and is moreover adapted to retain the cocks (not shown) used in connection with water gage glasses, in perfect alinement, and in that way lessen the liability of the glass being accidentally broken.

While I have entered into a detailed description of the construction and relative arrangements of the parts embraced in the present and preferred embodiment of my invention, I do not desire to be understood as confining myself to the said specific construction and relative arrangement of parts, inasmuch as in the future practice of the invention such changes or modifications may be made as fairly fall within the scope of the appended claims. For instance, instead of employing the shield with the outlet 7 connected to the chamber 5 at an upper point, as illustrated, in Fig. 2, the shield may be used in inverted position with the outlet 7 at the lowermost point, so as to enable the said outlet 7 and the pipe connected therewith to serve the additional function of a drain. I would have it understood, however, that when the shield is used in the position illustrated, the outlet 7 will afford a free escape for the steam from the broken gage glass or the connections thereof. This will be readily understood by reference to Figs. 1 and 3 to 6 in which the device is shown in the preferred position.

Having described my invention, what I claim and desire to secure by Letters-Patent, is:

1. A shield for water gage glasses, comprising a hollow body constructed and arranged to hold and contain a gage glass and having a chamber at its side connected through a plurality of ports with its interior and also having an outlet connected with one end of said chamber; holders connected to the opposite sides of the said body and panels of transparent material arranged in said holders.

2. A shield for water gage glasses, comprising a hollow body constructed and arranged to hold and contain a gage glass and having at one side a chamber connected through a plurality of ports with its interior, said chamber being provided with an offset; an outlet pipe connected with said offset; panel-holders connected to opposite sides of the body; and panels arranged in said holders.

3. A shield for water gage glasses, comprising a hollow body constructed and arranged to hold and contain a gage glass and having transparent means to display the glass and also having a chamber at its side connected through a port with its interior and also having an outlet leading from said chamber; said outlet being adapted to be connected with means for conveying steam and hot water to a point of discharge.

In testimony whereof I have hereunto set my hand in presence of two subscribing witnesses.

THOMAS F. CARBERY.

Witnesses:
C. S. MURRAY,
F. KERR.

---

Copies of this patent may be obtained for five cents each, by addressing the "Commissioner of Patents, Washington, D. C."